United States Patent [19]

Kawakami

[11] Patent Number: 5,032,769
[45] Date of Patent: Jul. 16, 1991

[54] DEVICE FOR MEASURING A CHARACTERISTIC OF A COLOR CATHODE RAY TUBE BASED ON SYNCHRONIZED SIGNALS

[75] Inventor: Yuichi Kawakami, Osaka, Japan

[73] Assignee: Minolta Camera Kabushiki Kaisha, Osaka, Japan

[21] Appl. No.: 455,627

[22] Filed: Dec. 22, 1989

[30] Foreign Application Priority Data

Dec. 27, 1988 [JP] Japan .................. 63-330930

[51] Int. Cl.[5] .............. H01J 29/51; G09G 1/28; H04N 17/00
[52] U.S. Cl. ...................... 315/368; 358/139
[58] Field of Search ................ 315/368; 358/10, 139

[56] References Cited

U.S. PATENT DOCUMENTS 4,593,309 6/1986 Uno et al. .................. 315/368

Primary Examiner—Gregory C. Issing
Attorney, Agent, or Firm—Joseph W. Price; Price, Gess & Ubell

[57] ABSTRACT

A device for measuring convergence of a color CRT periodically generating a test pattern in a predetermined portion of a screen of the color CRT including signal output means for outputting a signal corresponding to glow timing of the test pattern generated on the screen, image pickup means for picking up the test pattern on the screen to output an image signal, control means responsive to output of the signal output means for controlling the image pickup means so as to output the image signal during the time that the test pattern is not generated in the predetermined portion of the screen, and calculation means for calculating a convergence assessment value of the color CRT based on the image signal.

26 Claims, 13 Drawing Sheets

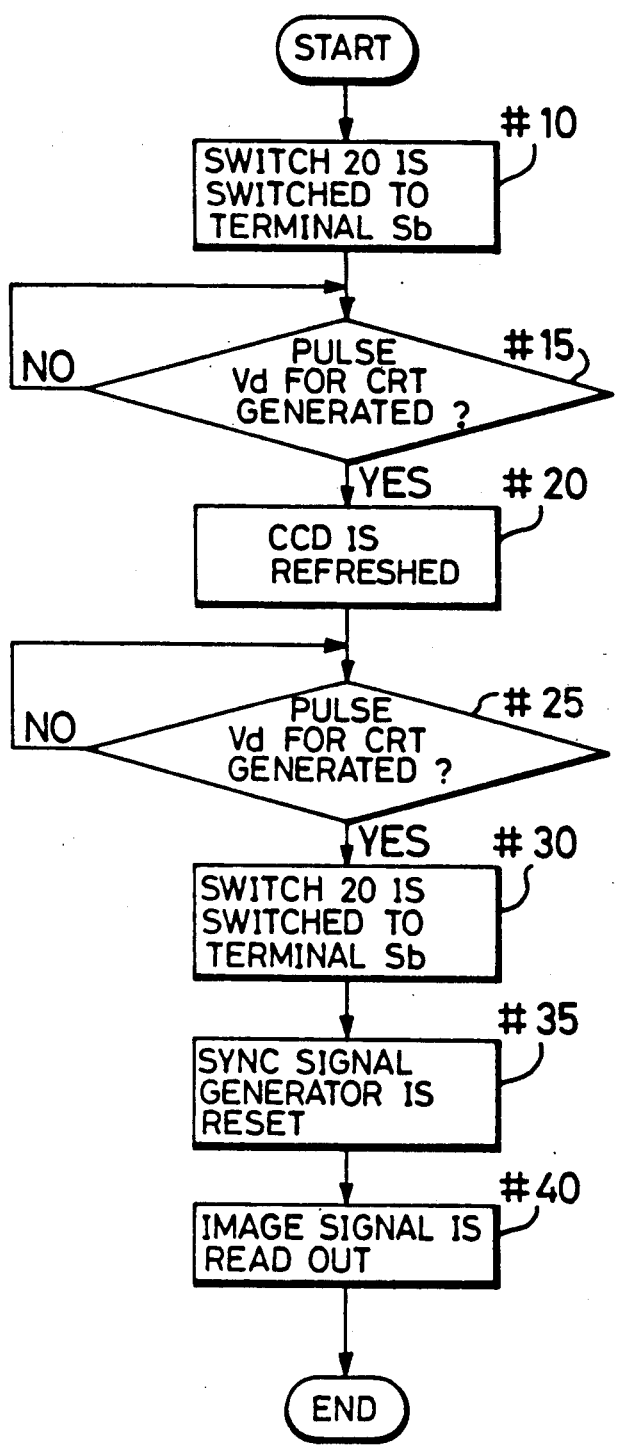

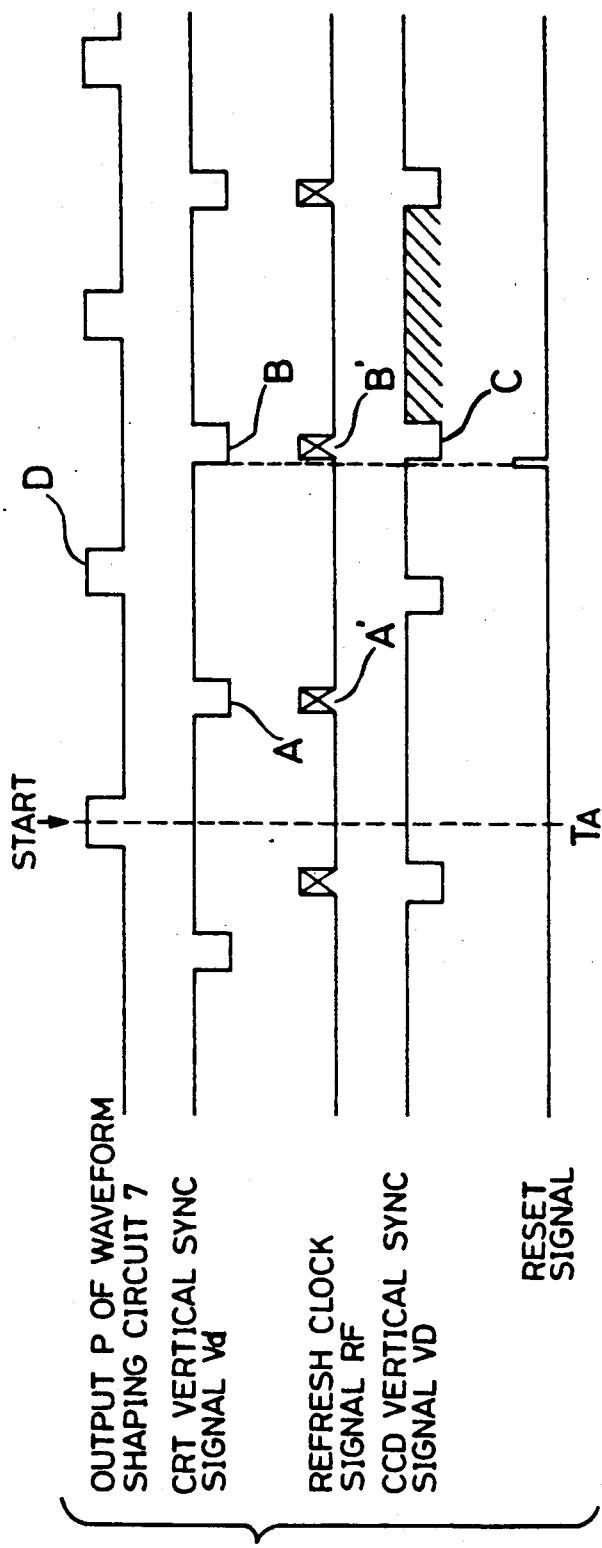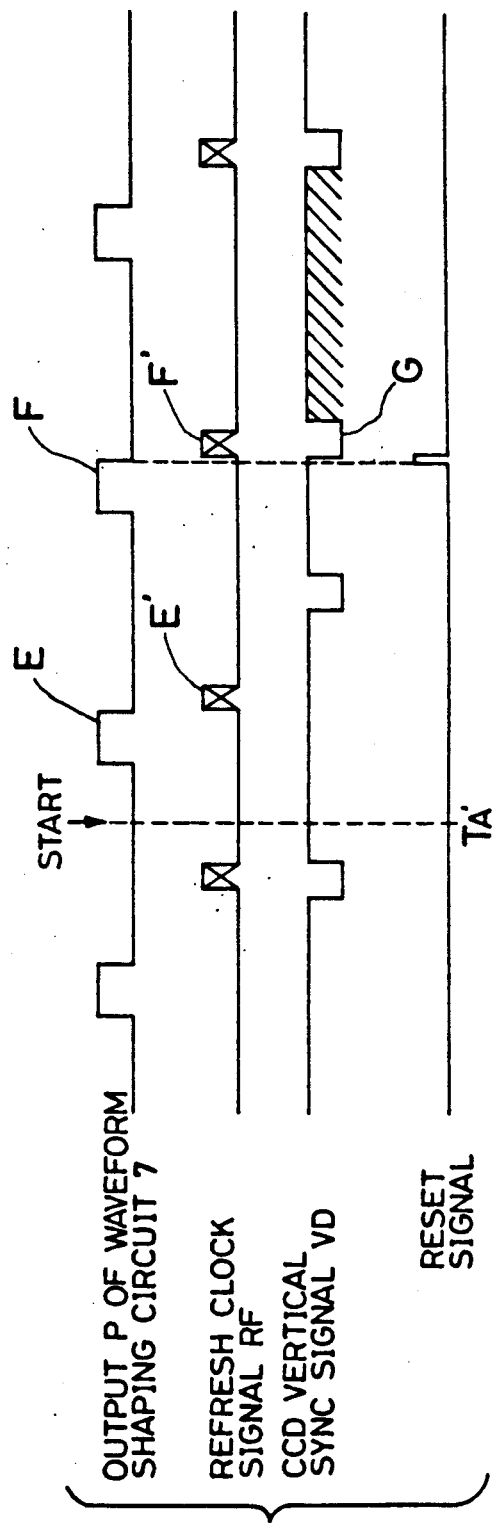

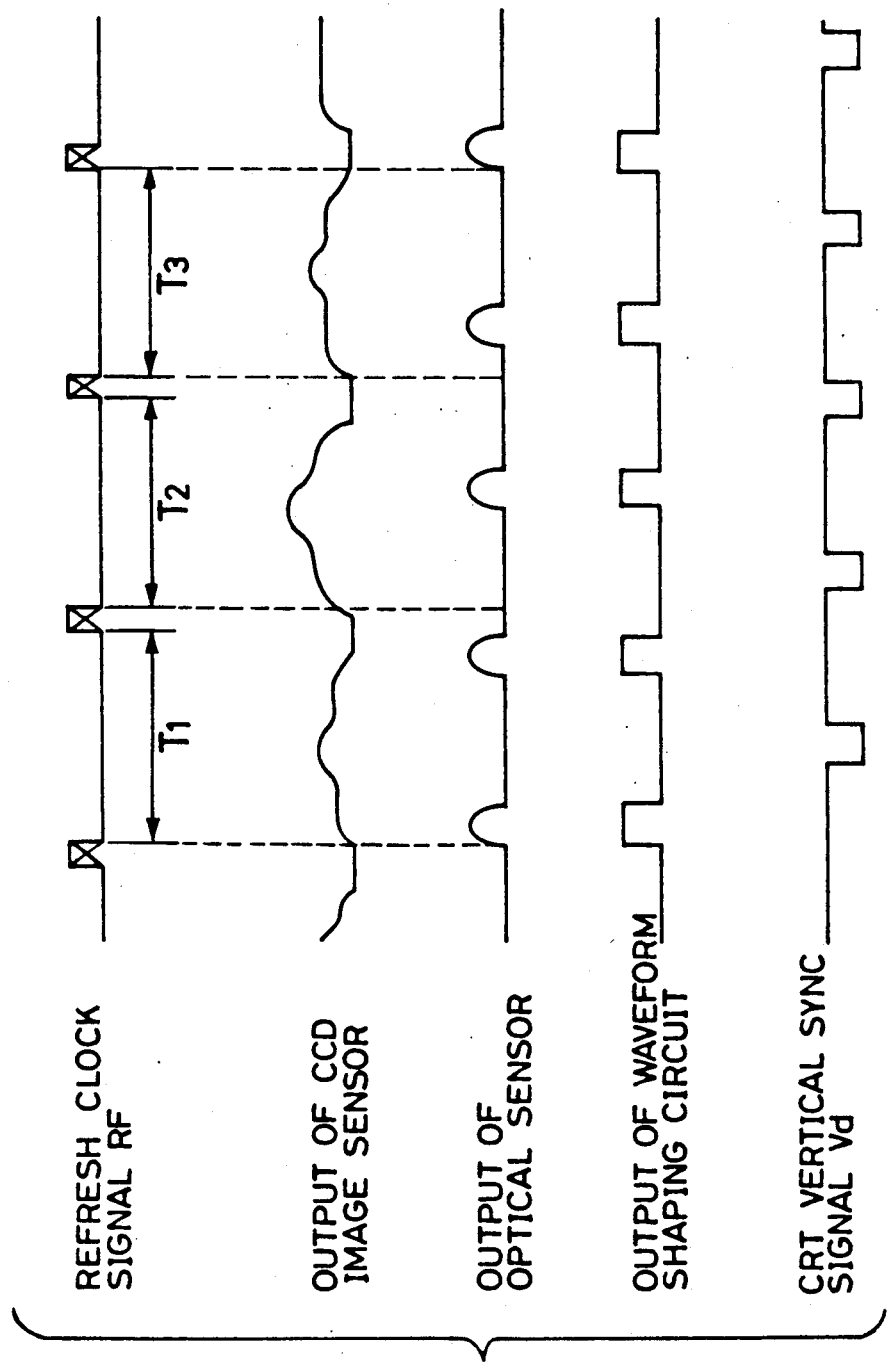

DEVICE FOR MEASURING A CHARACTERISTIC OF A COLOR CATHODE RAY TUBE BASED ON SYNCHRONIZED SIGNALS

BACKGROUND OF THE INVENTION AND RELATED ART STATEMENT

This invention relates to read and refresh timing of image signals of a color image pickup device (CCD image sensor) which is used as a picking up unit in a device for measuring convergence of a color cathode ray tube (hereinafter referred to as the CRT).

Various devices for measuring convergence have been proposed hitherto to enable convergence adjustment of a color CRT in a quantitative manner. In such devices, a test pattern for measurement is presented on a color CRT, separated into three primary color patterns through optical filters, and picked up by device. Then, the luminous center of each color pattern is calculated to obtain a convergence assessment value.

As an example, Japanese Unexamined Patent Publication 59-74780 discloses a device which first presents an entire white pattern on a CRT to be measured. The white pattern within a specified area is broken into red, blue and green patterns by the respective color separating filters, and picked up by an industrial TV (ITV) camera. The device obtains positional information of individual phosphor dots from these color patterns. Next, a white pattern for convergence assessment is presented on the CRT and picked up without using the color separating filters this time. Based on the positional information of the phosphor dots of each color obtained earlier in the process, the white pattern picked up is separated into red, blue and green patterns, from which luminous centers of gravity of individual color patterns are calculated. Deviation of the positions of the luminous centers of gravity is then obtained as an assessment value of misconvergence.

The example of a conventional device quoted above requires color separating filters as well as an ITV camera. Accordingly, it would be understood that this type of conventional device has a large mechanical size. Furthermore, in such a device of the prior art, the test pattern must be picked up more than once, inevitably requiring a longer measuring time.

To overcome these and other disadvantages of conventional devices, Japanese Patent Application No. 62-259088 has been filed which proposes a device to enable quick assessment of misconvergence. This proposed device employs a CCD image sensor provided with color separating filters as an image pickup device. It picks up the white pattern within a specified sampling area only once, substantially reducing the time required for assessment of misconvergence.

In the meantime, when a CCD image sensor is used as an image pickup device as in the above example, the drive circuit which causes the CRT to be measured to present a test pattern, and the drive circuit which causes the CCD image sensor to store an image signal and the image memory circuit to read the stored image signal have independent horizontal and vertical synchronization signal sources. Consequently, if the CRT drive circuit and the CCD image sensor drive circuit are not perfectly synchronized with each other, the image signal stored in the CCD image sensor would become unstable in some cases. More specifically, since the color CRT glows at exact intervals, glowing images may not be picked up exactly if the CCD image sensor drive timing that controls image signal storage and readout operations is not kept in perfect synchronism with the color CRT glow timing.

Shown in FIG. 15 is a timing chart where the CCD image sensor driving interval is longer than the color CRT glowing interval. Refresh clock signal RF shown in this timing chart is a reference clock signal which determines the timing of transferring the picture element signal on the imaging area of the CCD sensor to its image storage area. The optical sensor output is an output of an optical sensor which monitors the glowing condition of an area of the color CRT from where the CCD image sensor picks up the glowing pattern. The waveform shaping circuit shapes the output of the above mentioned optical sensor as shown in FIG. 15. Since the test pattern certainly glows once during each output pulse interval of the vertical synchronization signal Vd of the CRT to be measured, the output pulse interval of the waveform shaping circuit coincides with the output pulse of the vertical synchronization signal Vd. In the NTSC system, the output of the waveform shaping circuit and the vertical synchronization signal Vd have a common frequency of 60 Hz because the entire picture area is scanned at a field frequency of 60 Hz. However, it is not necessarily certain that the refresh clock signal RF is synchronized with the vertical synchronization signal Vd because they are produced by their respective sources.

If the CCD image sensor driving interval is longer than the color CRT glowing interval as shown in FIG. 15, it may so happen that two successive glowing images are detected by the optical sensor during image signal integration period T1 (which corresponds to the pulse interval of the refresh clock signal RF) of the CCD image sensor while only one glowing image is detected during integration period T2. In such a case, the integrated result of glow image luminance during integration period T1 would be twice as higher than that of glow image luminance during integration period T2, making an accurate measure of the image signal unobtainable. Furthermore, if the refresh clock pulse immediately following integration interval T3 should concur with the glow image detect timing of the optical sensor, in other words, a new glow image is generated on the screen during the time of transferring the image signal for an old glow image, the image signal for the new glow image comes into the image signal for the old glow image in the process of being transferred to disturb the image signal for the old glow image, consequently making it impossible to obtain the correct image signal. The above synchronization problem is even more significant especially when the test pattern is picked up by replacing red, blue and green filters one after another to obtain individual three color image signals at different timings.

SUMMARY OF THE INVENTION

The present invention has been made taking the above problems into consideration. Accordingly, it is an object of the present invention to provide a device for measuring convergence of a color CRT which makes it possible to provide an exact measure of misconvergence by synchronizing a drive circuit of a CCD image sensor for picking up a test pattern with a drive circuit of a color CRT to be measured.

According to the present invention, a device for measuring convergence of a color CRT periodically generating a test pattern in a predetermined portion of a screen of the color CRT comprising, signal output means for outputting a signal corresponding to glow timing of the test pattern generated on the screen, image pickup means for picking up the test pattern on the screen to output an image signal, control means responsive to the signal output means for controlling the pickup means so as to output the image signal during the time that the test pattern is not generated in the predetermined portion of the screen, and calculation means for calculating a convergence assessment value of the CRT based on the image signal.

In the device of the present invention, the image signal obtained by the pickup means is output during the turn-off of the test pattern. Consequently, the test pattern can be picked up in a stable and sound manner, and an accurate image signal can be obtained free from the effects of luminance variations within the viewing area due to a failure of synchronization between a drive circuit of the color CRT to be measured and a drive circuit of the image pickup means. The present invention eventually enables accurate assessment of misconvergence.

These and other objects, features and advantages of the present invention will become more apparent upon a reading of the following detailed description and drawings.

BRIEF DESCRIPTION OF THE DRAWINGS

FIG. 6 is a flowchart showing a first manner for determining timing of reading the picture element signal out of the CCD image sensor;

FIG. 7 is a timing chart for the first manner for determining timing of reading the picture element signal out of the CCD image sensor;

FIG. 9 is a timing chart for the second manner for determining timing of reading the picture element signal out of the CCD image sensor;

FIG. 15 is a timing chart showing a relation between glow timing of a color CRT and refresh timing of a CCD camera of a conventional device.

DETAILED DESCRIPTION OF PREFERRED EMBODIMENTS OF THE INVENTION

Figure 1:
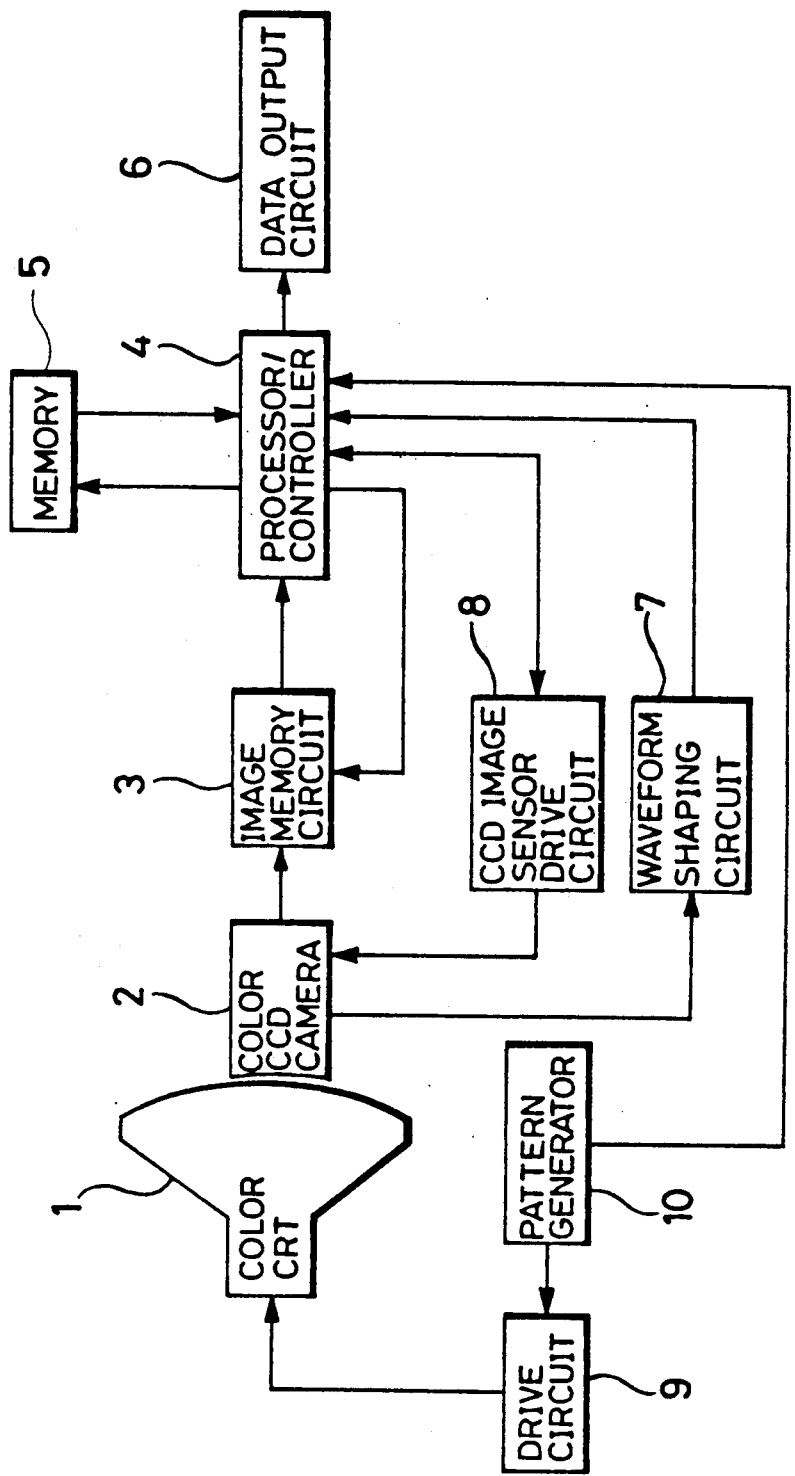
FIG. 1 is a system diagram of a device for measuring convergence of a color CRT according to the present invention.
Figure 2:
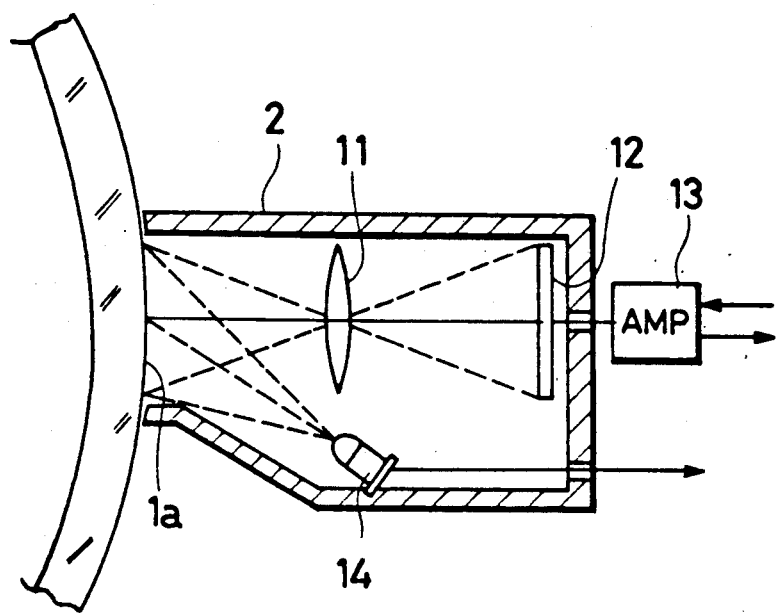
FIG. 2 is a cross sectional view of a color CCD camera used in the device.

FIG. 1 is a system diagram showing a preferred embodiment of the present invention. As shown in FIG. 1, a pattern generator 10 generates a test pattern for measurement of convergence. The test pattern is displayed on a color CRT 1. Placed face to face with the screen of color CRT 1 is a color CCD camera 2 incorporating a CCD image sensor to photograph an image of the test pattern. As shown in FIG. 2, the test pattern displayed within a viewing area 1a on the screen of color CRT 1 is focused on the imaging surface of the CCD image sensor 12 through a lens 11. The test pattern is then picked up by the CCD image sensor 12, and a resultant image signal is amplified by an amplifier 13 and outputted to an image memory circuit 3 shown in FIG. 1.

Driven by drive signals consisting of a read clock signal CCK, a horizontal clock signal HCK and a refresh clock signal RF (refer to a later explanation of FIG. 5) coming from a CCD image sensor drive circuit 8, the CCD image sensor 12 outputs an image signal to the image memory circuit 3. As explained later in this specification, the CCD image sensor drive circuit 8 generates these drive signals independently based on a command signal received from a processor/controller 4. The color CCD camera of this embodiment obtains images of three primary colors (R, G and B) from the image signal derived from a single shot of a white test pattern. As a result, there is no need to separate the image into three color values by replacing color separating filters, eliminating such adverse effects to the measurement conditions as fluctuation of the source voltage or generation of noise occurring when picking up individual color images of the test pattern by replacing color separating filters.

An optical sensor 14 is mounted outside the light path cutting across the lens 11 in CCD camera 2 to monitor the glowing condition within the viewing area 1a. The signal picked up by the optical sensor 14 is shaped into pulse waveforms by a waveform shaping circuit 7 shown in FIG. 1 and fed into the processor/controller 4. This signal is used for controlling the output sequence of the image signal from CCD camera 2 to the image memory circuit 3 as explained later hereof.

Made up of A/D converters and buffer memories, the image memory circuit 3 converts the image signals of individual colors (R, G, and B) outputted in an analog form from CCD camera 2 into a digital form and temporarily stores them in the buffer memories.

The processor/controller 4 is a signal processing circuit comprising a microprocessor. It controls overall operation of the measuring device according to a processing/control program stored in a memory unit 5, and calculates a convergence assessment value by using the image signal data temporarily stored in the image memory circuit 3. The convergence assessment value is written in the memory unit 5 and indicated at a data output unit 6.

Figure 3:
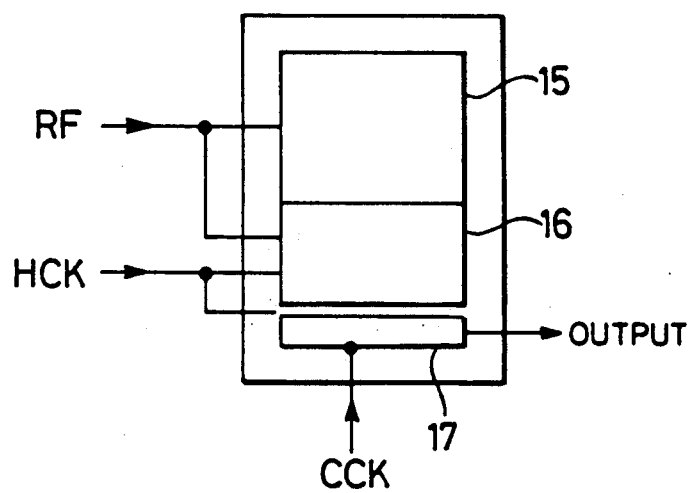
FIG. 3 is a diagram showing a frame transfer type CCD image sensor of the color CCD camera.

Next, FIG. 3 shows the CCD image sensor 12 of frame transfer type in detail. Referring to this diagram, the image signal derived from an imaging area 15 is transferred to an image storage area 16 responsive to a refresh clock signal RF, which is normally synchronized with a vertical synchronization signal VD of the CCD image sensor 12. The image signal in a vertical shift register of the image storage area 16 is transferred to a horizontal shift register 17 line by line at each individual pulse of a horizontal clock signal HCK and outputted from the horizontal shift register 17 to the image memory circuit 3 in synchronism with a read clock signal CCK. It will be noted that the charge of the imaging area 15 is refreshed when the image signal is transferred to the image storage area 16.

Figure 4A:
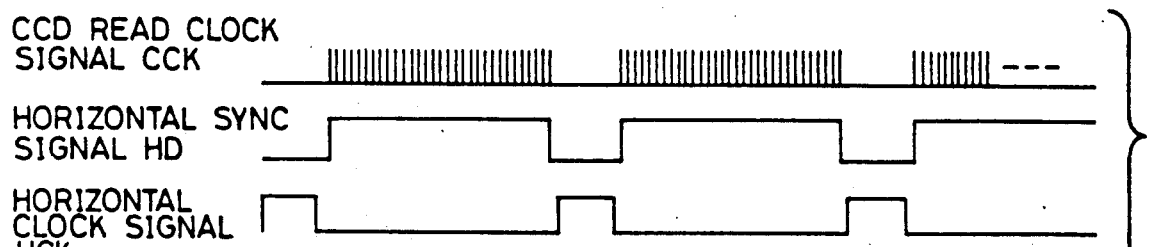
FIGS. 4A, 4B are timing charts showing clock signals that drive the CCD image sensor.
Figure 4B:
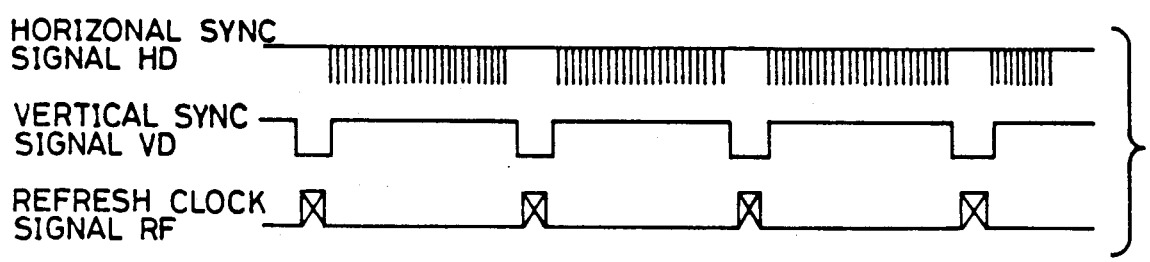

FIG. 4A shows a timing chart for the read clock signal CCK, horizontal clock signal HCK and horizontal synchronization signal HD of the CCD image sensor 12 in normal operating conditions. Also, FIG. 4B shows a timing chart for the horizontal synchronization signal HD, veritcal synchronization signal VD of the CCD image sensor 12 and refresh clock signal RF. Referring to these timing charts, it should be noted that the time base used in FIG. 4B is compressed compared to FIG. 4A.

Figure 5:
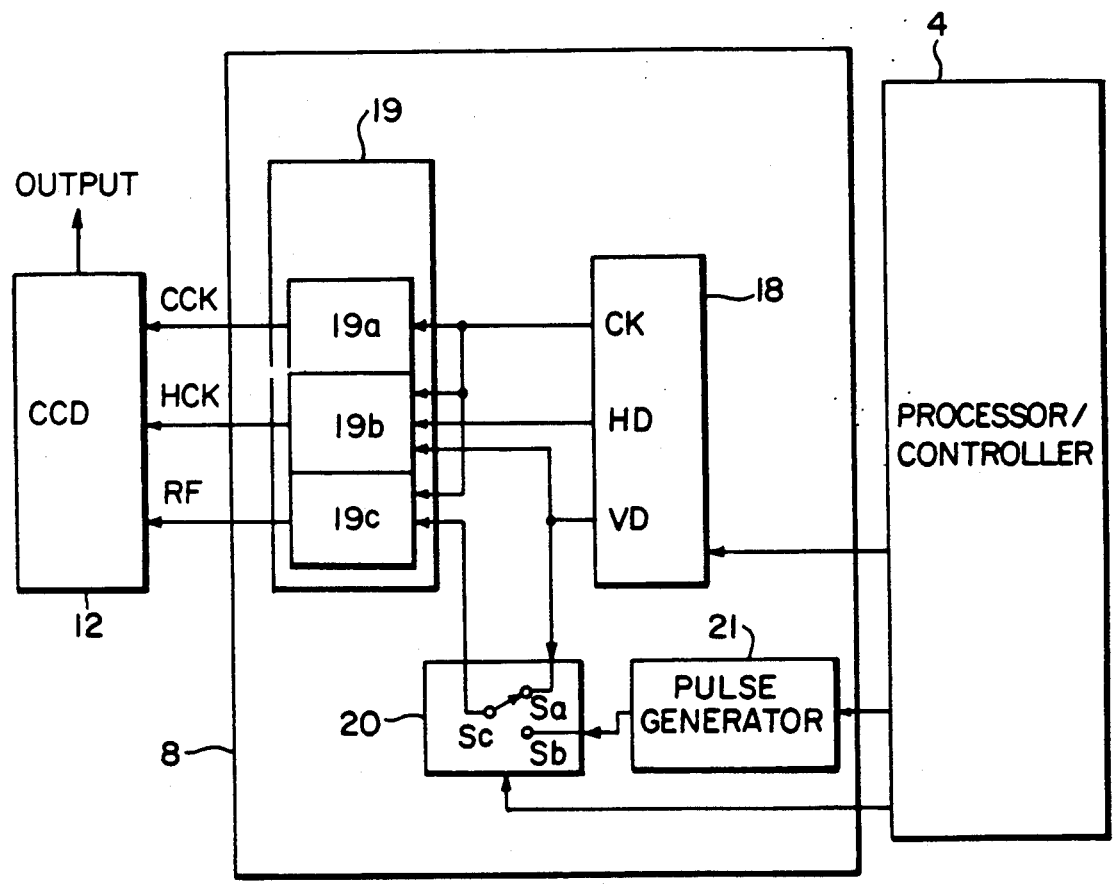
FIG. 5 is a diagram showing a construction of a CCD image sensor drive circuit.

FIG. 5 shows a construction of the CCD image sensor drive circuit 8, in which a synchronization signal generator 18 generates a reference clock signal CK, horizontal synchronization signal HD and vertical synchronization signal VD with an internal oscillator. As explained later in this specification, the processor/controller 4 generates a reset signal based on the incoming vertical synchronization signal Vd of the color CRT 1. When the reset signal is inputted to the synchronization signal generator 18, an internal counter of the synchronization signal generator 18 is reset. Then, the synchronization signal generator 18 generates the reference clock signal CK, horizontal synchronization signal HD and vertical synchronization signal VD in synchronism with the reset signal.

The reference clock signal CK is delivered to clock signal generators 19a, 19b and 19c in a CCD drive signal generator 19 while the horizontal synchronization signal HD and vertical synchronization signal VD are fed into the clock signal generator 19b. The vertical synchronization signal VD is also inputted to the clock signal generator 19c via a switching circuit 20 described later. The clock signal generator 19a generates the read clock signal CCK based on the reference clock signal CK while the clock signal generator 19b generates the horizontal clock signal HCK based on the reference clock signal CK, horizontal synchronization signal HD and vertical synchronization signal VD. The clock signal generator 19c generates the refresh clock signal RF based on the reference clock signal CK and the vertical synchronization signal VD. The clock signals CCK, HCK and HK are eventually inputted to the CCD image sensor 12 to drive it.

The switching circuit 20 includes two input terminals Sa and Sb. The input terminal Sa receives the vertical synchronization signal VD outputted from the synchronization signal generator 18 while the input terminal Sb receives output pulses of a pulse generator 21. The pulse generator 21 produces pulses having the same pulselength as the vertical synchronization signal VD based on a control signal fed from the processor/controller 4. Switched by the switching circuit 20 operating in accordance with the control signal fed from the processor/controller 4, the vertical synchronization signal VD or horizontal synchronization signal HD is inputted to the clock signal generator 19c.

Now, the image signal readout procedure for measuring convergence of a color CRT is explained in detail.

When reading the image signal out of the CCD image sensor 12 into the image memory circuit 3, the terminal Sc in the switching circuit 20 is first connected to its terminal Sb by the switch control signal fed from the processor/controller 4. Then, a pulse generated in the pulse generator 21 by the control signal fed from the processor/controller 4 is inputted to the clock signal generator 19c. Driven by this pulse, the clock signal generator 19c transmits a refresh clock pulse RF to the CCD image sensor 12 to refresh it.

There are two manners to control the transferring timing of the image signal from the imaging area 15 to the image storage area 16. The first manner utilizes the vertical synchronization signal Vd that drives the color CRT to be measured while the second manner uses the output signal of the waveform shaping circuit 7 which shapes the output waveform of the optical sensor 14 that monitors the glowing condition within the viewing area 1a.

More specifically, in the first manner, an electric charge accumulated in the CCD image sensor 12 is refreshed by a first pulse generated in the pulse generator and synchronized with the vertical synchronization signal Vd. Next, the glowing test pattern is picked up until a second pulse is generated in synchronization with the vertical synchronization signal Vd, and the resultant image signal is transferred in response to the second pulse synchronized with the vertical synchronization signal Vd.

In the second manner, an electric charge accumulated in the CCD image sensor 12 is refreshed by a first pulse generated in the pulse generator and synchronized with the waveform shaping circuit 7. Then, the glowing test pattern is picked up until a second pulse is generated in synchronization with the waveform shaping circuit 7, and the resultant image signal is transferred in response to the second pulse synchronized with the waveform shaping circuit 7.

Also, in the second manner, an electric charge accumulated in the CCD image sensor 12 may be refreshed by the first synchronization pulse of the vertical synchronization signal Vd, and the image signal may be transferred at the trailing edge of the second output pulse of the waveform shaping circuit 7.

FIG. 6 is a flowchart showing the image signal pickup and transfer sequence according to the first manner mentioned above. The sequence is explained below in further detail referring to the flowchart in FIG. 6.

First, the terminal Sc is connected to the terminal Sb in the switching circuit 20 (#10). The processor/controller 4 then monitors the vertical synchronization signal Vd of the color CRT fed from the pattern generator 10 until a synchronization pulse is generated (#15). When a vertical synchronization signal Vd has been detected, the processor/controller 4 transmits a control signal to the pulse generator 21. Upon receiving the control signal, the pulse generator 21 produces a pulse and outputs it to the clock signal generator 19c via the switching circuit 20. When the pulse is inputted to the clock signal generator 19c, it outputs the refresh clock signal RF to the CCD image sensor 12, causing the image signal to be transferred from the imaging area 15 of the CCD image sensor 12 to its storage area 16 (#20). Consequently, the imaging area 15 is refreshed and is enabled to integrate an glow image on the screen. Here again, the processor/controller 4 monitors the next vertical synchronization signal Vd to be generated in the next cycle (#25). When the next vertical synchronization signal Vd is detected again, the processor/controller 4 outputs a switch control signal to the switching circuit 20 to connect the terminal Sc to the terminal Sa (#30). Next, a reset signal is outputted from the processor/controller 4 to the synchronization signal generator 18, causing the synchronization signal generator 18 to generate a reference clock signal CK, horizontal synchronization signal HD and vertical synchronization signal VD. The reference clock signal CK, horizontal synchronization signal HD and vertical synchronization signal VD are inputted to the CCD drive signal generator 19. Based on these signals, the CCD drive signal generator 19 generates a transferring clock signal CCK, horizontal clock signal HCK and refresh clock signal RF and outputs them to the CCD image sensor 12 (#35). With these clock signals, the CCD image sensor 12 transfers the image signal accumulated in the imaging area 15 to the image memory circuit 3 (#40). Specifically, when the refresh clock signal RF is generated, the image signal accumulated in the imaging area 15 is transferred to the image storage area 16, and transferred to the image memory circuit 3 in response to the transferring clock signal CCK and the horizontal clock signal HCK.

FIG. 7 is a timing chart depicting the image signal transferring procedure according to the first manner. It is assumed that an image pickup process or the sequence shown in the flowchart in FIG. 6 begins at $T_A$ in the timing chart. The processor/controller 4 detects a synchronization pulse A of the vertical synchronization signal Vd occurring immediately after $T_A$, and transmits a control signal which generates a refresh clock signal RF A'. The refresh clock signal RF has a shorter pulse width than the vertical synchronization signal Vd. Accordingly, the image signal is transferred during the time that no glow image is presented on the screen of the color CRT. Subsequently, when the processor/controller 4 detects another synchronization signal Vd B generated in the next cycle, the reset signal outputted from the processor/controller 4 generates a synchronization pulse C of the CCD vertical synchronization signal VD, and then a refresh clock signal RF B'. As seen apparently from the output pulse D of the waveform shaping circuit 7, the viewing area 1a of the color CRT certainly glows once during the period between pulses A' and B' of the refresh clock signal RF. Consequently, glowing light on the viewing area 1a represented by the output pulse D is picked up by the CCD image sensor 12 and integrated in its imaging area 15. It could be seen that if the transfer of the image signal is suspended in a given number of generations of the vertical synchronization signal Vd, the image area 15 integrates the given number of glow images. In other words, the integration of glow image may be practiced in a desirable number of generations of the vertical synchronization signal Vd as well as once.

Controlled by the processor/controller 4, the image memory circuit 3 stores the image signal picked up by the CCD image sensor 12 during the period (shaded area in FIG. 7) between the leading edge and trailing edge of the vertical synchronization signal pulse VD. This procedure ensures the device to obtain an accurate image signal output.

Figure 8:
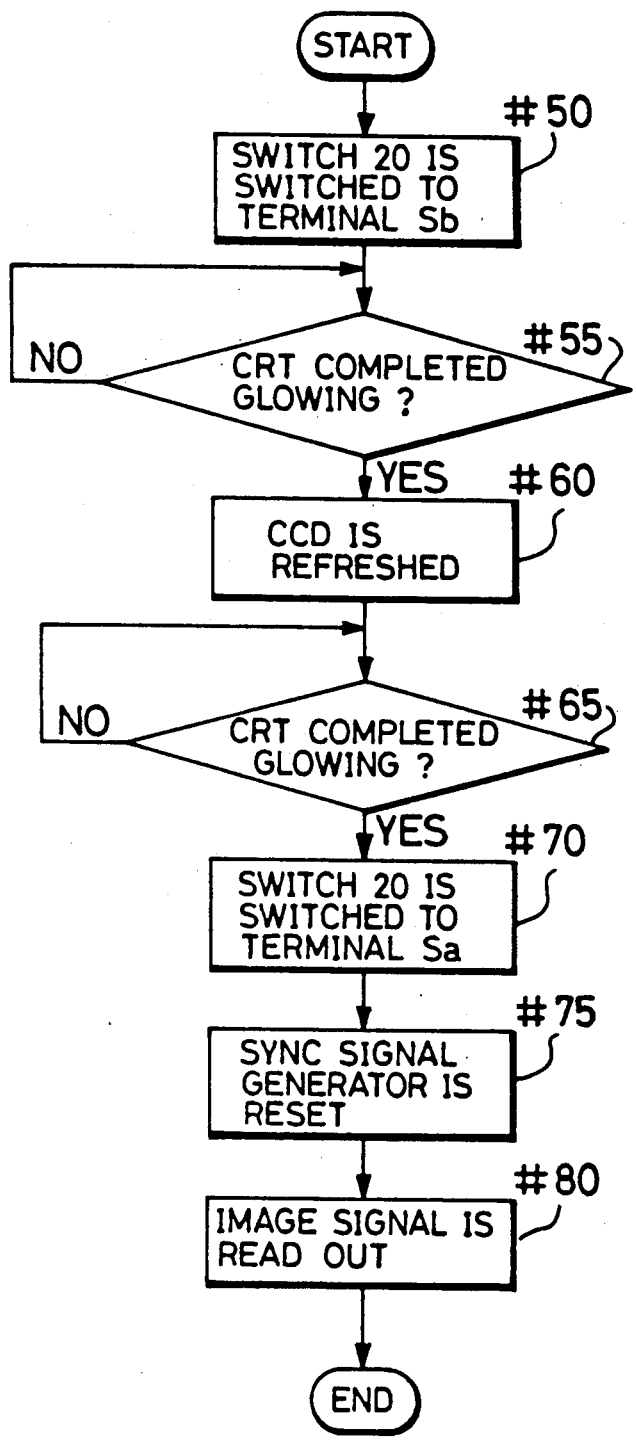
FIG. 8 is a flowchart showing a second manner for determining timing of reading the picture element signal out of the CCD image sensor.

Next, the second manner is explained in detail where the output signal of the waveform shaping circuit 7 is used. FIG. 8 is a flowchart showing the image signal pickup and transfer sequence according to the second manner.

First, the terminal Sc is connected to the terminal Sb in the switching circuit 20 (#50). The processor/controller 4 then monitors the glowing light detect signal P outputted from the waveform shaping circuit 7 and waits for the trailing edge of the glowing light detect signal P (#55). When the trailing edge is detected, the processor/controller 4 transmits a control signal to the pulse generator 21, causing it to produce a pulse. This pulse is outputted to the clock signal generator 19c via the switching circuit 20. When the pulse is inputted to the clock signal generator 19c, it outputs the refresh clock signal RF to the CCD image sensor 12, and the image signal is transferred from the imaging area 15 to the image storage area 16 (#60). Consequently, the imaging area 15 is refreshed and then integrates a glow image on the screen. Here again, the processor/controller 4 monitors the glowing light detect signal P outputted from the waveform shaping circuit 7 and waits for the trailing edge of the glowing light detect signal P (#65). When the trailing edge is detected again, the processor/controller 4 outputs a switch control signal to the switching circuit 20 to connect the terminal Sc to the terminal Sa (#70). Thereafter, the same operations as described in steps #35 and #40 in the aforementioned first manner are carried out in steps #75 and #80.

FIG. 9 is a timing chart depicting the image signal transferring procedure according to a second manner. It is assumed that an image pickup procedure or the sequence shown in the flowchart in FIG. 8 begins at $T_{A'}$ in the timing chart. The processor/controller 4 detects an output pulse E in the output P of the waveform shaping circuit 7 occurring immediately after $T_{A'}$, and transmits a control signal to the pulse generator 21 at the trailing edge of the detected pulse E, causing it to generate a refresh clock signal RF E'. Subsequently, when the processor/controller 4 detects another output pulse F in the output P of the waveform shaping circuit 7 in the next cycle, the reset signal fed from the processor/controller 4 at the trailing edge of the detected pulse F generates a synchronization pulse G of the CCD vertical synchronization signal VD, and then a refresh clock signal RF F'. As is apparent from the output pulse F of the waveform shaping circuit 7, the viewing area 1a of the color CRT 1 certainly glows once during the period between pulses E' and F' of the refresh clock signal RF. Consequently, the glowing light represented by the output pulse F is picked up by the CCD image sensor 12 and integrated in its imaging area 15. It could be seen that if the transfer of the image signal is suspended in a given number of generations of the glowing light detect signal P, the image area 15 integrates the given number of glow images. In other words, the integration of glow image may be practiced in a desirable number of generations of the glowing light detect signal P as well as once.

Controlled by the processor/controller 4, the image memory circuit 3 stores the output signal of the CCD image sensor 12 during the period (shaded area in FIG. 9) between the leading edge and trailing edge of the vertical synchronization signal pulse VD.

Figure 10:
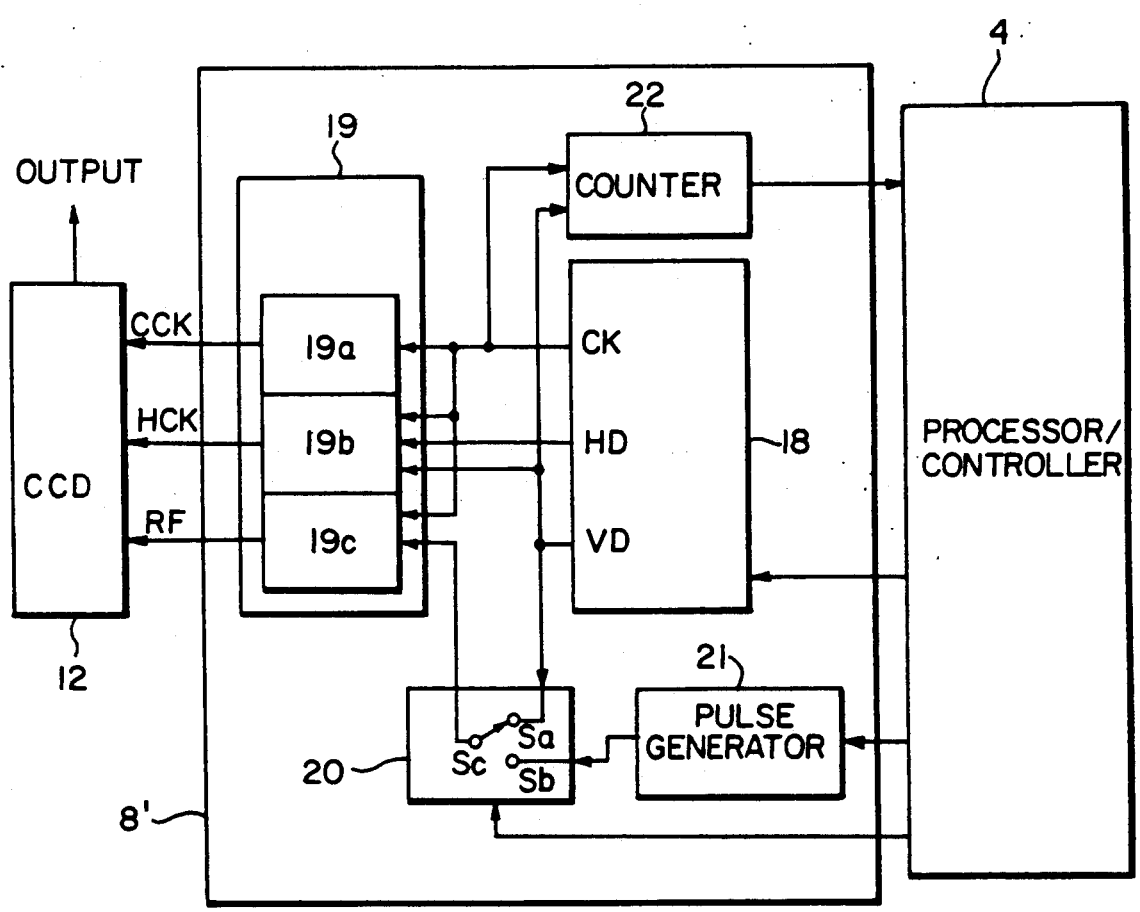
FIG. 10 is a block diagram of a second CCD image sensor drive circuit.

FIG. 10 is a diagram showing a construction of a second CCD image sensor drive circuit 8'. Here, the CCD image sensor drive circuit 8' is additionally provided with a counter 22 compared to the CCD image sensor drive circuit 8 shown in FIG. 5. The counter 22 receives pulses produced by dividing a reference clock signal CK (or a horizontal synchronization signal HD) outputted from a synchronization signal generator 18 and is reset by a vertical synchronization signal VD outputted also from a synchronization signal generator 18. An output of the counter 22 is fed into the processor/controller 4. Given below is an operational description of a device including the second CCD image sensor drive circuit 8'.

First, the following explanation reveals how the glowing interval of a CRT is measured. The optical sensor 14 mounted in CCD camera 2 monitors the glowing condition in the viewing area 1a of the color CRT. Therefore, when a test pattern is presented by a color TV circuit of the NTSC system, the optical sensor 14 outputs 60 Hz pulses. These pulses are shown as output waveform (14) in FIG. 11. Indicated at (7) is an output waveform obtained after the waveform (14) is shaped by the waveform shaping circuit 7.

The counter 22 counts reference clock pulses CK after it is reset at the trailing edge of a vertical synchronization pulse VD. The counter 22 repeats the counting operation at an interval $T_D$ of the vertical synchronization signal VD.

The processor/controller 4 reads the value T1 of the counter 22 and stores it in a memory at the leading edge of an output pulse of the waveform shaping circuit 7, for example. Next, the processor/controller 4 reads the value T2 of the counter 22 and stores it in the memory at the leading edge of a succeeding output pulse of the waveform shaping circuit 7. The value T1 is subtracted from the value T2 to obtain the glowing interval $T_{CRT}$.

Given below is a description of a procedure for determining timing of transferring the image signal from the imaging area 15 to the image storage area 16.

Figure 12:
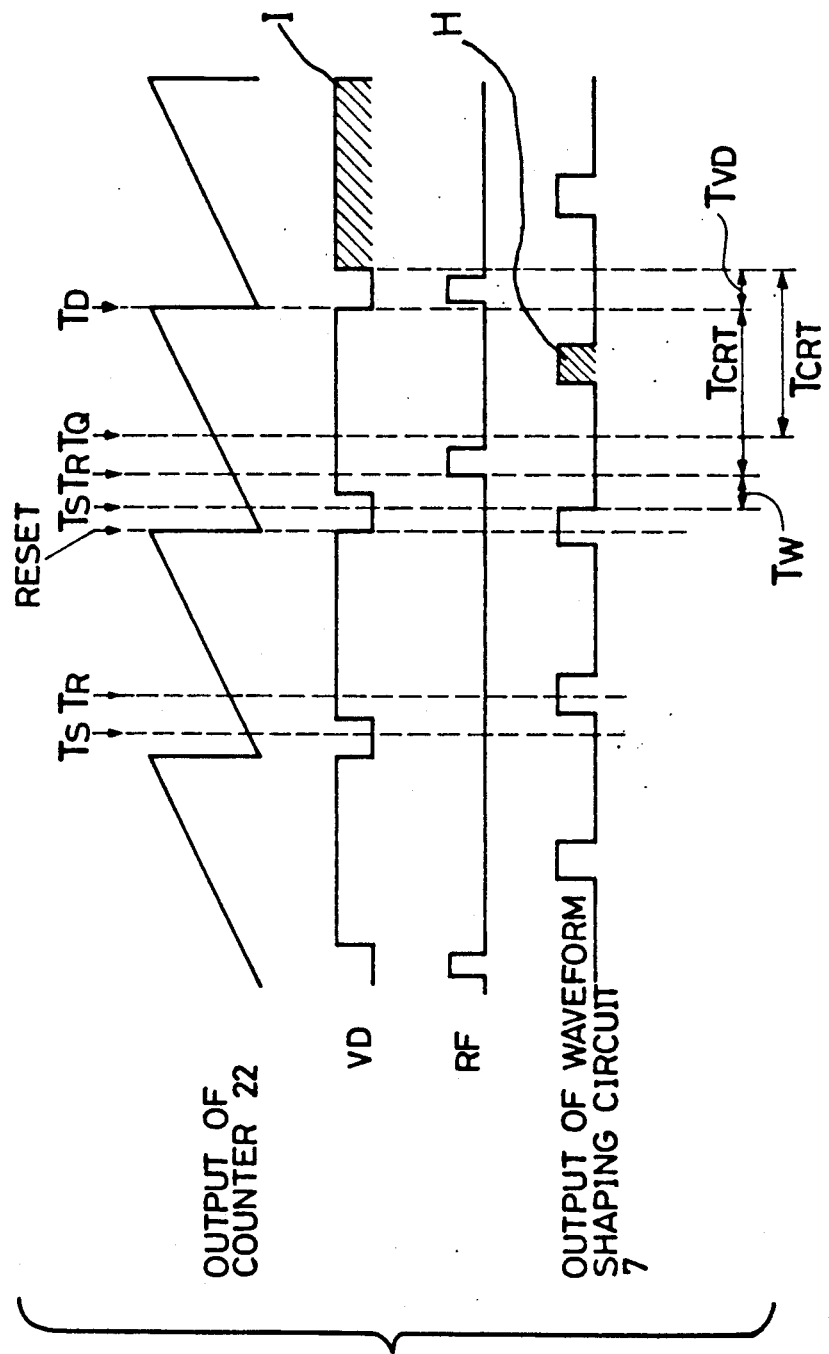
FIG. 12 is a timing chart showing the CCD output signal read timing.

Referring now to FIG. 12, the parameters $T_D$, $T_{VD}$ and $T_W$ are defined as follows:

$T_D$ = Period of vertical synchronization signal VD $T_{VD}$ = Pulselength of vertical synchronization signal VD $T_W$ = Glowing time of CRT Also, the parameters $T_S$, $T_R$ and $T_Q$ are defined as $T_S = T_D - T_{CRT} - T_W$ $T_R = T_D - T_{CRT}$ $T_Q = T_D - T_{CRT} + T_{VD}$ If the CRT to be measured glows between $T_R$ and $T_Q$, it will glow again as a matter of course during the period in which a next vertical synchronization pulse VD occurs. Therefore, if the image signal is transferred during this period, abnormal image data will be obtained. To avoid this inconvenience, a special arrangement is made to skip the image transfer procedure when the color CRT glows during the period between $T_R$ and $T_Q$.

Figure 13:
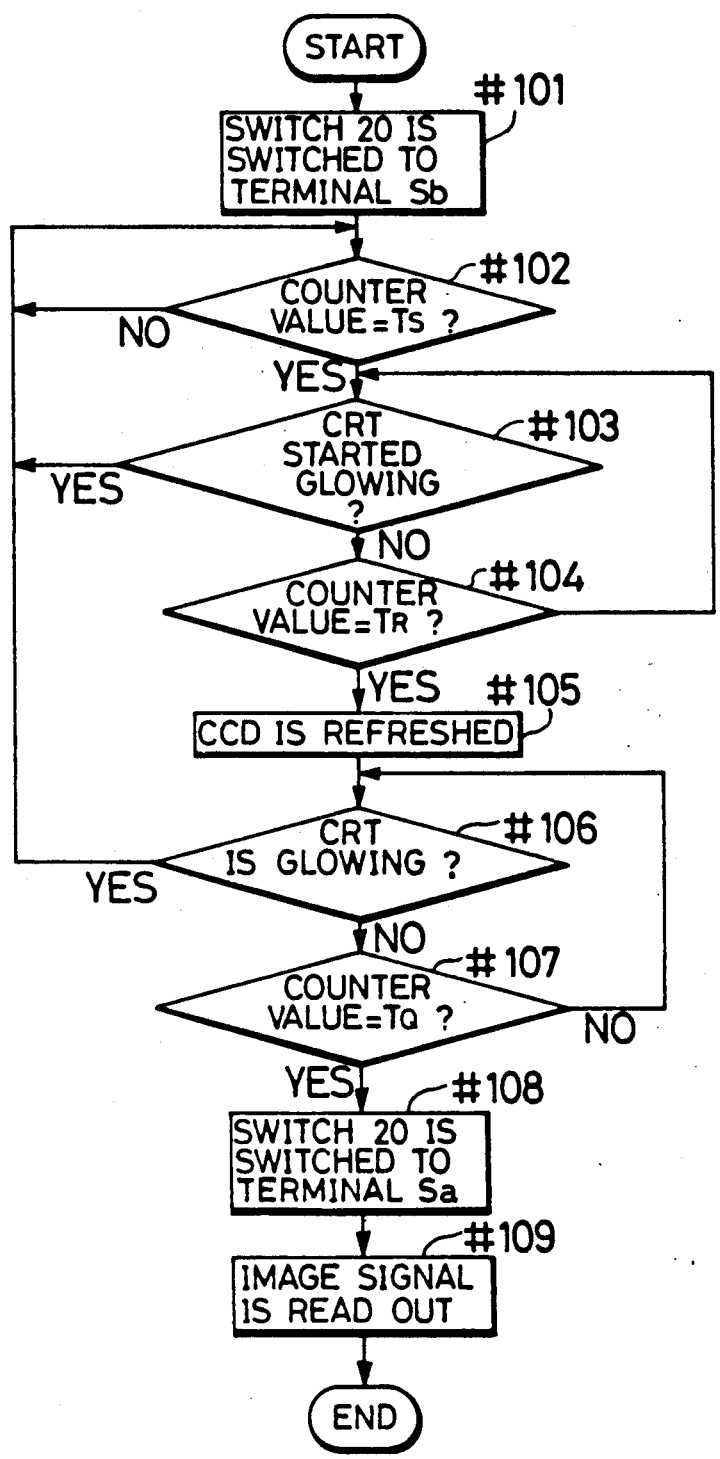
FIG. 13 is a flowchart showing a third manner for determining timing of reading the picture element signal out of the CCD image sensor.

The image signal transfer procedure is further described in the following referring to FIGS. 10, 12 and 13.

Figure 11:
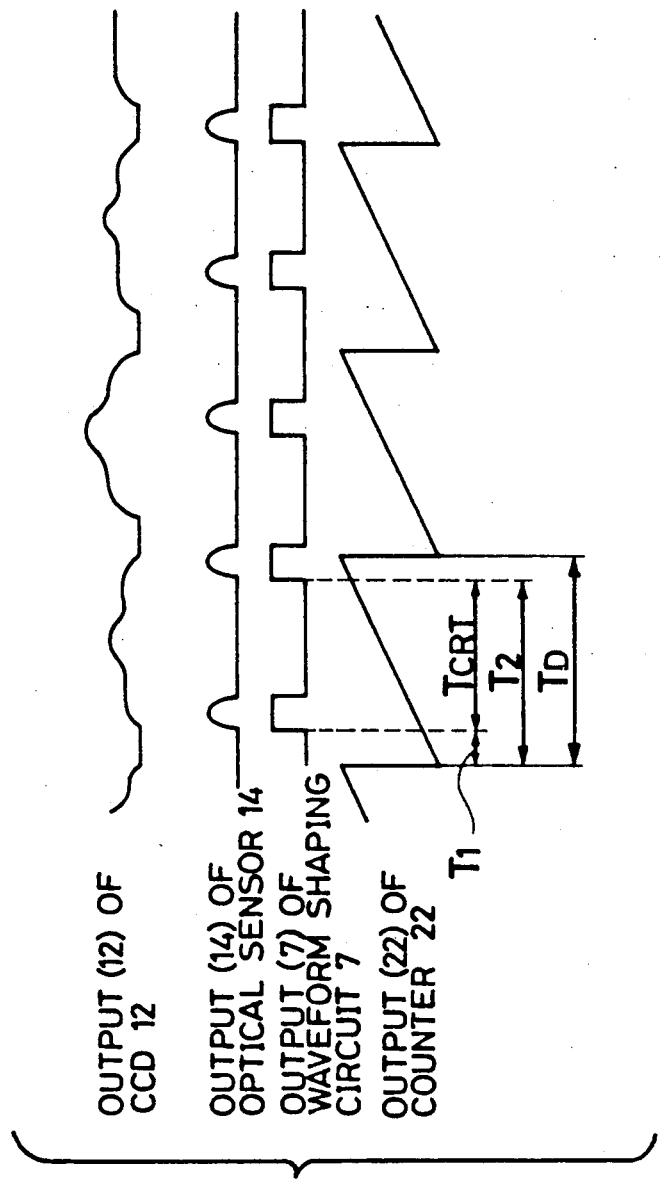
FIG. 11 is a timing chart showing a relation between glow timing of a color CRT and output timing of a counter of the second CCD image sensor drive circuit.

The terminals Sa and Sc in the switching circuit 20 of the CCD image sensor drive circuit 8' are connected with each other in normal operating conditions. The vertical synchronization signal VD outputted from the synchronization signal generator 18 is inputted to the circuit 19c of the CCD drive signal generator 19 via the switching circuit 20 as well as to the circuit 19b. FIG. 11 shows a timing chart according to which the CCD image sensor drive circuit 8' operates.

When transferring the image signal out of the CCD image sensor 12, the switching circuit 20 connects the terminal Sc to the terminal Sb to put generation of the refresh clock signal RF in the CCD drive signal generator 19 under the control of the processor/controller 4.

Referring now to the flowchart shown in FIG. 13, operations performed by the processor/controller 4 are described in the following. After the switching circuit 20 has been changed over as mentioned above (#101), the processor/controller 4 waits for the value of the counter 22 to become $T_S$ (#102). If the CRT starts glowing while the counter 22 is taking a value between $T_S$ and $T_R$, it follows that the CRT is kept glowing even after the timing $T_R$. Therefore, transfer of the image signal at the timing $T_D$ is inhibited. For this purpose, the processor/controller 4 monitors the output of the waveform shaping circuit 7 which shapes the output waveform (14) of the optical sensor 14 during the period between counter values $T_S$ and $T_R$ (#103). If the CRT starts glowing during this period, the processor/controller 4 returns to step #102. In the case when the CRT does not glow in the viewing area 1a of the color CRT between counter values $T_S$ and $T_R$, the pulse generator 21 is activated at $T_R$ so that it outputs a pulse to the circuit 19c of the CCD drive signal generator 19, causing it to generate a refresh pulse RF (#104 and #105). It should be noted that the duration of the refresh pulse RF is shorter than that of the vertical synchronization pulse VD.

The processor/controller 4 monitors the output of the waveform shaping circuit 7 even after the refresh pulse RF is generated until the counter value reaches $T_Q$ (#106). If the CRT glows during this period, the processor/controller 4 returns to step #102. In case it does not start glowing in the viewing area 1a of the color CRT during this period, the terminals Sc and Sb are connected at counter value $T_Q$ so that the vertical synchronization pulse VD outputted from the synchronization signal generator 18 is fed into the circuit 19c of the CCD drive signal generator 19 (#107 and #108).

When the next vertical synchronization pulse VD is generated, the image signal integrated in the imaging area 15 during the period between counter values $T_Q$ and $T_D$ is transferred to the image storage area 16 and transferred to the further stage.

Because the period between counter values $T_R$ and $T_D$ corresponds to a glowing period $T_{CRT}$ of the viewing area 1a of the color CRT and the viewing area 1a is not glowed during the period between counter values $T_R$ and $T_Q$, the test pattern image is glowed once between $T_Q$ and $T_D$. The glowing time of the viewing area 1a corresponds to the shaded area H of the waveform shaping circuit 7 output waveform shown in the timing chart in FIG. 12. Glowing light of the viewing area 1a during the period between $T_Q$ and $T_D$ impinges the imaging area 15 of the CCD image sensor 12 and is integrated. The processor/controller 4 stores the CCD output signal in the image memory circuit 3 during the period between the leading edge and trailing edge of the vertical synchronization pulse VD, which corresponds to the period shown by the shaded area I of the waveform VD in the timing chart in FIG. 12. This ensures the device to obtain an accurate image signal output.

Here, measurement of convergence is briefly described in the following. In this connection, it should be noted that measurement of convergence is disclosed in detail in Japanese Patent Application No. 61 261833 filed by Minolta Camera Kabushiki Kaisha, an assignee of the present application.

Figure 14:
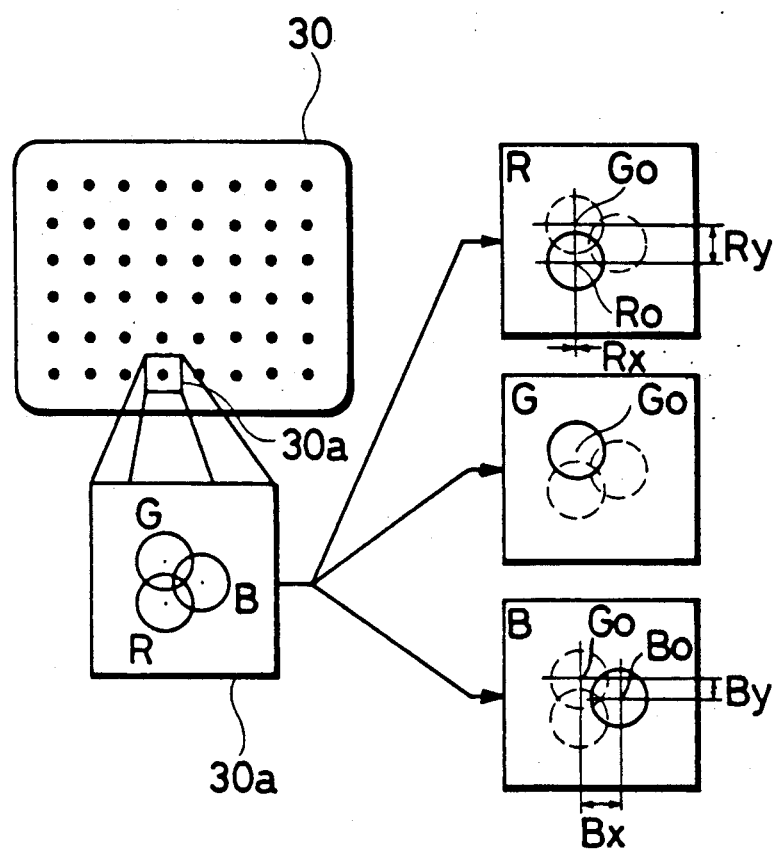
FIG. 14 is a diagram generally illustrating measurement of convergence.

First, the pattern generator 10 generates a white dot pattern indicated at 30 in FIG. 14, for example, and the pattern 30 is displayed on the color CRT 1 to be measured. The CCD camera 2 picks up an image within a specified area, for example, an area 30a which contains one white dot of the pattern 30. Controlled by the processor/controller 4, the image signal is stored in image memory elements of the image memory circuit 3 according to an appropriate algorithm. The image memory elements store individual primary color image signals outputted by the R, G and B image pickup elements of the CCD camera 2. The processor/controller 4 calculates the luminous centers of gravity of red, green and blue phosphor dots contained in the image from the R, G and B image signals stored in the image memory elements. Subsequently, deviation of the luminous center of gravity $B_O$ of the blue phosphor dots from the luminous center of gravity $G_O$ of the green phosphor dots is obtained as a horizontal distance $B_X$ and a vertical distance $B_Y$. Similarly, deviation of the luminous center of gravity $R_O$ of the red phosphor dots from the luminous center of gravity $G_O$ of the green phosphor dots is obtained as a horizontal distance $R_X$ and a vertical distance $R_Y$. These distance values, representing the convergence, are outputted to the data output unit 6.

The preferred embodiment disclosed above uses a color CCD camera. A device for measuring convergence of a color CRT may use a camera including a monochrome CCD sensor combined with three color separating filters in which R, G and B image signals are obtainable by a time sharing method.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A device for measuring a characteristic of a color cathode ray tube, CRT, which periodically generates a test pattern on a predetermined portion of a screen comprising:
    means for receiving glow light from the test pattern, including an image pickup means for generating charges representative of the test pattern during a time period of receiving a glow light from the test pattern, and storing the charges;
    control means responsive to a time period of the test pattern on the CRT for outputting charges from the glow light receiving means as an image signal when the test pattern is not generated, and
    calculation means for calculating a characteristic assessment value of the color CRT based on the image signal.

2. A device according to claim 1 wherein said means includes:
    glow measurement means for receiving for monitoring the glowing condition of the screen to output a glow signal; and
    glow timing signal output means responsive to said glow signal for outputting a glow timing signal corresponding to the glow timing of the test pattern generated on the screen.

3. A device according to claim 2 wherein said control means is responsive to said glow timing signal for controlling said image pickup means so as to output the image signal in synchronization with the turn-off of the test pattern on the screen.

4. A device according to claim 2 wherein said glow timing signal output means includes calculation means for calculating a generation cycle of the test pattern based on said glow signal to output a generation cycle signal representative of passage of the generation cycle.

5. A device according to claim 4 wherein said control means includes:
    a first clock signal output means for outputting a first clock signal for directing operation of said image pickup means: and
    timing control means for controlling the output timing of image signal of said image pickup means based on said generation cycle signal and said first clock signal.

6. A device according to claim 5 further comprising means for receiving a second clock signal for directing the glow timing of the test pattern, wherein said signal output means outputs a timing signal corresponding to said second clock signal.

7. A device according to claim 6 wherein said second clock signal is a vertical synchronization signal for the color CRT, said control means includes timing control means for controlling the output timing of image signal of said image pickup means based on the timing signal corresponding to the vertical synchronization signal.

8. A device according to claim 1 wherein said image pickup means is a charge storage type solid image sensor for integrating photo-electric converted charge and transferring the integrated charge to output the image signal.

9. A device according to claim 8 wherein said control put means includes:
    glow measurement means for monitoring the glowing condition of the screen to output a glow signal; and
    glow timing signal output means responsive to said glow signal for butputting a glow timing signal corresponding to the glow timing of the test pattern generated on the screen.

10. A device according to claim 9 wherein said control means is responsive to said glow timing signal for controlling said image pickup means so as to output the image signal in synchronization with the turn-off of the test pattern on the screen.

11. A device according to claim 9 wherein said control means includes:
    integration start means responsive to the glow timing signal for starting the integration of said image pickup means in synchronized with the turn-off of the test pattern on the screen; and
    integration termination means responsive to the glow timing signal for terminating the integration of said image pickup means and outputting the integrated image signal in synchronization with the turn-off of the test pattern generated after the integration start.

12. A device according to claim 9 wherein said glow timing signal output means includes calculation means for calculating a generation cycle of the test pattern based on said glow signal to output a generation cycle signal representative of passage of the generation cycle.

13. A device according to claim 12 wherein said control means includes:
    a first clock signal output means for outputting a first clock signal for directing operation of said image pickup means; and
    timing control means for controlling the output timing of image signal of said image pickup means based on said generation cycle signal and said first clock signal.

14. A device according to claim 13 wherein said timing control means includes:
integration start means for starting the integration of said image pickup means;
integration termination means responsive to the first clock signal for terminating the integration of said image pickup means and outputting the integrated image signal at a timing representative of passage of the generation cycle after the integration start; and
integration start control means for controlling said integration start means based on said generation cycle signal and said first clock signal.

15. A device according to claim 8 further comprising means for receiving a clock signal for directing the glow timing of the test pattern, wherein said signal output means includes timing signal output means for outputting a timing signal corresponding to said second clock signal.

16. A device according to claim 15 wherein said clock signal is a vertical synchronization signal for the color CRT, said control means includes timing control means for controlling the output timing of image signal of said image pickup means based on a timing signal corresponding to a vertical synchronization signal.

17. A device according to claim 16 wherein said control means includes:
integration start means responsive to the timing signal corresponding to a vertical synchronization signal for starting the integration of said image pickup means; and
integration termination means responsive to the timing signal for terminating the integration of said image pickup means in synchronization with a timing signal representative of a vertical synchronization signal generated after the integration start and outputting the integrated image signal.

18. A device according to claim 8 wherein said control means includes;
glow measurement means for monitoring the glowing condition of the screen to output a glow signal, and
timing signal output means for outputting a timing signal corresponding to a vertical synchronization signal generated for the color CRT;
integration start means responsive to the generation of the timing signal for starting the integration of said image pickup means, and
integration termination means for terminating the integration of said image pickup means in synchronized with the turn-off of the test pattern after the integration start.

19. A device as claimed in claim 1 wherein the calculation means includes means for calculating a convergence assessment value representing convergence of each electrical beam from the cathode ray tubes against each color phosphor based on the image signal.

20. A device according to claim 1, further comprising means for receiving a first vertical clock signal representing the glow timing of the test pattern to control the control means so that the control means permits the glow light receiving means to provide an output in response to the vertical clock signal.

21. A device according to claim 20, further comprising:
means for enabling the storage of charges on the glow light receiving means in response to the first vertical clock signal, and
means for operating the control means to output the stored charges in response to a second vertical clock signal so that the image signal corresponds to the test pattern generated between the first and second signals.

22. A device according to claim 8, further comprising means for receiving a first vertical clock signal representing the glow timing of the test pattern to enable the means for receiving to store charges.

23. A device according to claim 22, further comprising means for operating the control means to output the stored charges in response to a second vertical clock signal so that the image signal corresponds to the test pattern generated in a period between the first and second signals.

24. A device for measuring a characteristic of a color cathode ray tube, CRT, which is driven with a vertical clock signal to generate a test pattern comprising:
means for receiving glow light from the test pattern to generate charges while receiving glow light from the test pattern and to store the charges;
means for generating a turn-off signal in response to a turn-off of the test pattern;
means for outputting the charges from the receiving means so as to output the image signal in response to either of the vertical clock signal and the turn-off signal, and
means for calculating a characteristic assessment value of the color CRT based on the image signal.

25. A device as claimed in claim 24 wherein the calculation means includes calculating a convergence assessment value representing convergence of each electrical beam from the cathode ray tube against each color phosphor in the CRT based on the image signal.

26. A device for measuring convergence of a color CRT periodically generating a test pattern in a predetermined portion of a screen of said color CRT, comprising:
signal output means for outputting a signal corresponding to glow timing of the test pattern generated on the screen, including:
glow measurement means for monitoring the glowing condition of the screen to output a glow signal, and
glow timing signal output means responsive to said glow signal for outputting a glow timing signal corresponding to the glow timing of the test pattern generated on the screen;
image pickup means for picking up the test pattern on the screen to output an image signal;
control means responsive to output of said signal output means for controlling said image pickup means so as to output the image signal during the time that the test pattern is not generated in the predetermined portion of the screen, and
calculation means for calculating a convergence assessment value of the color CRT based on the image signal.

* * * * *